US006868181B1

(12) United States Patent
Feiten et al.

(10) Patent No.: US 6,868,181 B1
(45) Date of Patent: Mar. 15, 2005

(54) METHOD AND DEVICE FOR DETERMINING A SIMILARITY OF MEASURE BETWEEN A FIRST STRUCTURE AND AT LEAST ONE PREDETERMINED SECOND STRUCTURE

(75) Inventors: Wendelin Feiten, Neubiberg (DE); Wolfgang Rencken, München (DE)

(73) Assignee: Siemens Aktiengesellschaft, Münich (DE)

( * ) Notice: Subject to any disclaimer, the term of this patent is extended or adjusted under 35 U.S.C. 154(b) by 0 days.

(21) Appl. No.: 09/743,430

(22) PCT Filed: Jul. 1, 1999

(86) PCT No.: PCT/DE99/01951

§ 371 (c)(1),
(2), (4) Date: Jan. 8, 2001

(87) PCT Pub. No.: WO00/03311

PCT Pub. Date: Jan. 20, 2000

(30) Foreign Application Priority Data

Jul. 8, 1998 (DE) .......................................... 198 30 536

(51) Int. Cl.$^7$ ................................................. G06K 9/00
(52) U.S. Cl. ........................ 382/181; 382/153; 382/195
(58) Field of Search ................................. 382/181, 195, 382/153, 215, 216; 701/28; 348/119

(56) References Cited

U.S. PATENT DOCUMENTS

| | | | |
|---|---|---|---|
| 4,628,453 A | | 12/1986 | Kamejima et al. |
| 5,093,869 A | * | 3/1992 | Alves et al. ................. 382/199 |
| 5,144,685 A | * | 9/1992 | Nasar et al. ................. 382/153 |
| 5,386,378 A | * | 1/1995 | Itoh et al. .................... 708/816 |
| 5,414,625 A | | 5/1995 | Hattori |
| 5,684,695 A | * | 11/1997 | Bauer ........................... 701/23 |

FOREIGN PATENT DOCUMENTS

| | | |
|---|---|---|
| DE | 43 24 531 | 12/1994 |
| DE | 195 32 104 | 1/1997 |
| EP | 0 190 742 | 8/1986 |
| EP | 0 492 512 | 7/1992 |
| JP | 09054828 | 2/1997 |

OTHER PUBLICATIONS

Yasushi Yagi, et al. "Map–Based Navigation for a Mobile Robot with Omnidirectional Image Sensor COPIS", IEEE Transactions on Robotics and Automation, vol. 11, No. 5, (1995), pp. 634–647.

Asteasu, C., et al. "Three–dimensional world model building and imaging system based on a priori knowledge", Elsevier Science BV, Computers in Industry, vol. 24, No. 1, (1994) pp. 39–54.

Bierling, M., Displacement Estimation by Hierarchical Blockmatching, SPIE, vol. 1001, Visual Communications and Image Processing (1988), pp. 942–951.

Karch, Oliver et al., "Zum Lokalisationsproblem für Roboter", Autonome Mobile Systeme (1996), pp. 128–137.

Feiten, W. et al., Ein videobasiertes System zur Erfassung von Verkehrsdaten, (1991), 13. DAGM–Symposium, pp. 507–514.

Von Seelen, Werner et al., "Visual Information Processing in Neural Architecture", (1994), 16. DAGM–Symposium, pp. 36–57.

* cited by examiner

*Primary Examiner*—Kanjibhai Patel
*Assistant Examiner*—John Strege
(74) *Attorney, Agent, or Firm*—Schiff Hardin LLP (57) ABSTRACT

At least one base element is defined for structures, and surroundings-related information is assigned to each of these base elements. The surroundings-related information characterizes the corresponding base element. A measure of similarity is determined for the structures, the determination being effected in a manner dependent on the base elements and also on the surroundings-related information assigned to the base elements.

52 Claims, 4 Drawing Sheets

METHOD AND DEVICE FOR DETERMINING A SIMILARITY OF MEASURE BETWEEN A FIRST STRUCTURE AND AT LEAST ONE PREDETERMINED SECOND STRUCTURE

BACKGROUND OF THE INVENTION

1. Field of the Invention

The invention relates to a computer-aided determination of a measure of similarity between a first structure and at least one predetermined second structure.

2. Description of the Related Art

Such a method is disclosed in M. Bierling, Displacement Estimation by Hierarchical Blockmatching, SPIE, Vol. 1001, Visual Communications and Image Processing '88, pp. 942–951, 1988 (Bierling). In this image processing method, in the context of a motion estimation between two chronologically successive images for an image block to be coded, in the chronologically preceding image, an image area is sought which is as similar as possible to the image block to be coded. This is done by determining a sum of the square differences of the pixel-assigned coding information (brightness value or color value) of the pixels of the image block to be coded and of the pixels in an investigated area in the chronologically preceding image. This means that for the comparison of two structures in this approach from Bierling, the entire first structure (an image block to be coded) is compared with a second structure (an area in the chronologically preceding image) in its entirety.

This procedure is extremely costly with regard to the memory space required for storing the structures, and also with regard to the computing time required for determining the measure of similarity (in this case, the measure of similarity is the sum of the square differences).

The following procedure is disclosed in O. Karch and H. Noltemeier, Autonome Mobile Systeme (Autonomous Mobile Systems) 1996, G. Schmidt and F. Freyberger, (Eds.), Zum Lokalisationsproblem für Roboter [Regarding the Localization Problem for Robots], Springer Verlag, ISBN 3-54061-751-5, pp. 128–137, 1996 (Karch & Noltemeier): for the comparison of a structure, the elements of the structure are interpreted as polygonal progressions and the polygonal progressions are compared in their entirety, including the consideration of angles between interconnected elements of the polygonal progressions.

This approach is disadvantageous, particularly in that it is not robust relative to recordings made by a robot for its orientation in a predetermined space. The space is in this case represented by a predetermined, stored map.

If some elements of the polygonal progression are not recorded by the robot, then the method disclosed in Karch & Noltemeier is not robust enough to lead to results of sufficient quality. Moreover, the procedure for the comparison of the recorded image with the map in order to compare structures with one another is extremely computationally intensive.

SUMMARY OF THE INVENTION

Consequently, the invention is based on the problem of determining a measure of similarity between a first structure and at least one predetermined second structure which is robust with respect to possible recording errors and can be carried out more rapidly, with less computation time being required, than the known methods.

The problem is solved by a method for the computer-aided determination of a measure of similarity between a first structure and at least one predetermined second structure, comprising the steps of: defining at least one base element for said first structure and said second structure; assigning surroundings-related information to each of said at least one base elements, said surroundings-related information characterizing a corresponding said base element; and determining a measure of similarity, which describes a similarity between said first structure and said second structure, for said first structure and said second structure, said measure of similarity being determined in a manner dependent on said base elements and on said surroundings-related information assigned to said base elements.

The problem is also solved by an arrangement for the computer-aided determination of a measure of similarity between a first structure and at least one predetermined second structure, comprising a processor configured to: define at least one base element for said first structure and said second structure; assign surroundings-related information to each base element, said surroundings-related information characterizing a corresponding base element; and determine a measure of similarity, which describes a similarity between said first structure and said second structure, for said first structure and said second structure, said measure of similarity being determined in a manner dependent on said at least one base element and on said surroundings-related information assigned to said respective base elements.

In the case of the method, in each case at least one base element is defined for the first structure and the second structure. Surroundings-related information is assigned to each of the base elements, which surroundings-related information characterizes the corresponding base element. The measure of similarity, which describes the similarity between the first structure and the second structure, is determined for the first structure and the second structure. The measure of similarity is determined in a manner dependent on the base elements and on the surroundings-related information assigned to the base elements.

The arrangement has a processor which is set up in such a way that the following steps can be carried out:

in each case, at least one base element is defined for the first structure and the second structure, surroundings-related information is assigned to each of the base elements, the surroundings-related information characterizes the corresponding base element, the measure of similarity, which describes the similarity between the first structure and the second structure, is determined for the first structure and the second structure, and the measure of similarity is determined in a manner dependent on the base elements and on the surroundings-related information assigned to the base elements.

The invention is distinguished by the fact that, compared with the prior art, considerably less computation time is required for carrying out the determination of the measure of similarity, and also by increased robustness with respect to possible sensor errors or modeling errors.

Preferred developments of the invention are described below.

The structures may be contained in a map which is recorded as a scene from the surroundings using a recording device, for example a laser scanner or a camera. In this case, it is necessary to compare the recorded structures with a stored map in order to perform orientation or to construct a map which can be used for orientation. The accuracy of the method is increased if the measure of similarity is determined on the basis of a plurality of base elements and their respectively assigned surroundings-related information. A further refinement of the invention provides for at least a portion of the base elements to be a line, a section or a point. The surroundings-related information may be formed by further base elements and the associated geometrical arrangement relative to the base elements. The base elements may have different forms.

A development of the invention in which at least a portion of the surroundings-related information is formed in such a way that it is invariant with respect to errors which occur when constructing the map has the effect of achieving a further qualitative improvement in the results. A further simplification of the invention can be achieved in that, in a preferred development, the further base elements are grouped into a plurality of surroundings-related information types containing surroundings-related information features which are each assigned to a surroundings-related information type. The surroundings-related information features assigned to a surroundings-related information type may be stored having been sorted in a predeterminable manner in a list. The sorting can be carried out in such a way that it is invariant with respect to the errors—explained above—when constructing the map.

The measure of similarity is preferably determined by way of dynamic programming. The structures may each describe a physical object, for example a recorded space, or else a recorded scene, and also, by way of example walls, doors, or any other objects. In an alternative embodiment, it is likewise possible for the first structure to describe a physical object and the second structure to describe a model of a physical object. Furthermore, the structures may represent data structures in a database. The invention can preferably be used for the orientation of a mobile autonomous apparatus or else for the determination of a map for the orientation of the apparatus. In a preferred development, the autonomous apparatus is a robot.

BRIEF DESCRIPTION OF THE DRAWINGS

Exemplary embodiments of the invention are illustrated in the figures and are explained in more detail below.

DESCRIPTION OF THE PREFERRED EMBODIMENTS

Figure 2:
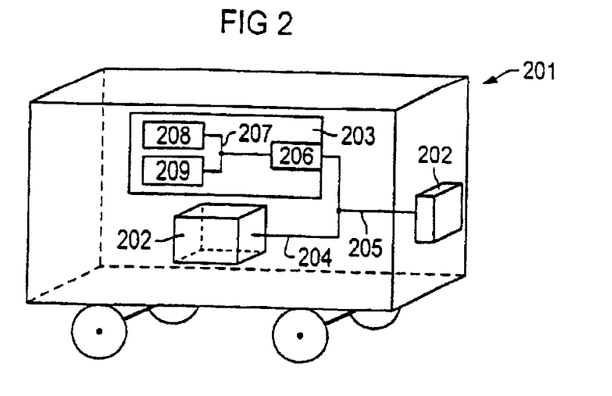
FIG. 2 is a schematic diagram illustrating a robot with recording device.

FIG. 2 shows a robot 201 with a plurality of laser scanners 202. The laser scanners 202 record images of the surroundings of the robot 201 and feed the images to a computing unit 203 via connections 204, 205.

The image signals are fed to a memory 208 via an input/output interface 206, which is connected via a bus 207 to the memory 208 and also to a processor 209.

The method described below is carried out in the processor 209 that is configured to carry out the method steps described below.

Figure 1A:
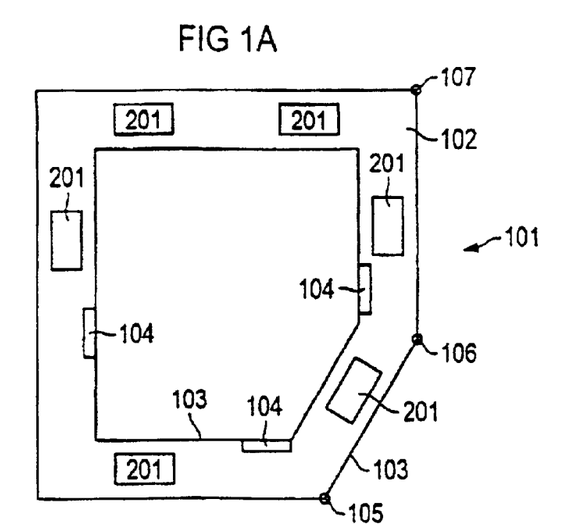
FIGS. 1a and 1b are schematic diagrams showing a passageway in which a robot is intended to orient itself (FIG. 1a), and also a symbolic sketch of the recordings of the robot and its conversion into a map, an error in the determination of the map and its effects on the mapping of the passageway relative to the actual passageway from FIG. 1a being illustrated (FIG. 1b)

FIG. 1a symbolically shows a map 101 representing a passageway 102. The robot 201 moves through the passageway and records images of its surroundings using the laser scanners 202. It records walls 103 in the process. The robot 201 records images of its surroundings at different times, producing an image of the entire map 101.

In the passageway 102 there are also obstacles 104 in the form of shelves, cabinets, or similar items which project into the passageway 102. Corners 105, 106, 107 of the passageway 102 are interpreted as the starting point and ending point of a wall, which is stored in the form of a section segment.

Figure 1B:
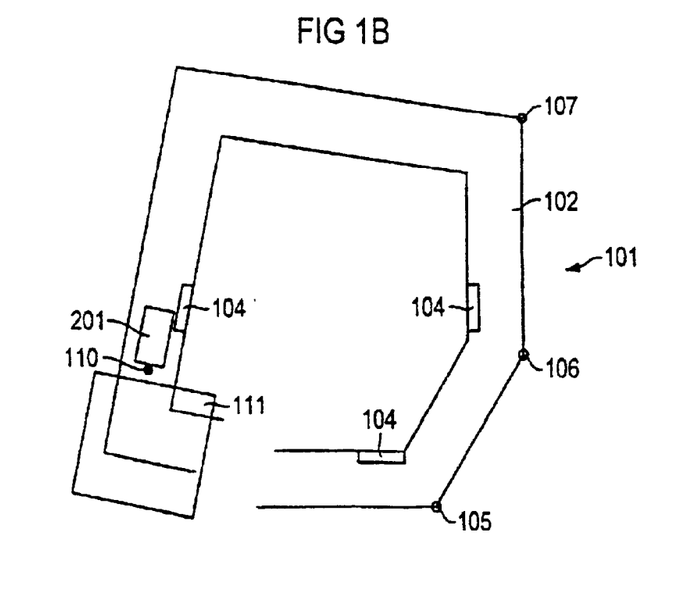

FIG. 1b illustrates the map from FIG. 1a, not when ideal recordings are made, as is assumed in the case of the situation illustrated in FIG. 1a, but when errors happen in the course of the recording by the robot 201.

The robot 201 moves in the passageway 102 and records images of its surroundings at periodic intervals. The robot 201 orients itself on the basis of the recorded images and also of the stored map 101.

The orientation takes place in such a way that the robot 201 feeds the images to the processor 209. In the processor 209, a similarity comparison of elements of the recorded image with elements of the stored, predetermined map 101 is determined and an attempt is made to determine from this the present position of the robot 201.

The robot 201 is situated at a position 110 and records an image area 111 using its laser scanner. It attempts to match this image area 111 to the stored map 101 in order to determine information for its orientation. This corresponds to the comparison of a first structure, which characterizes the recorded image area 111, with at least one predetermined second structure from the predetermined, stored map 101.

Figure 5:
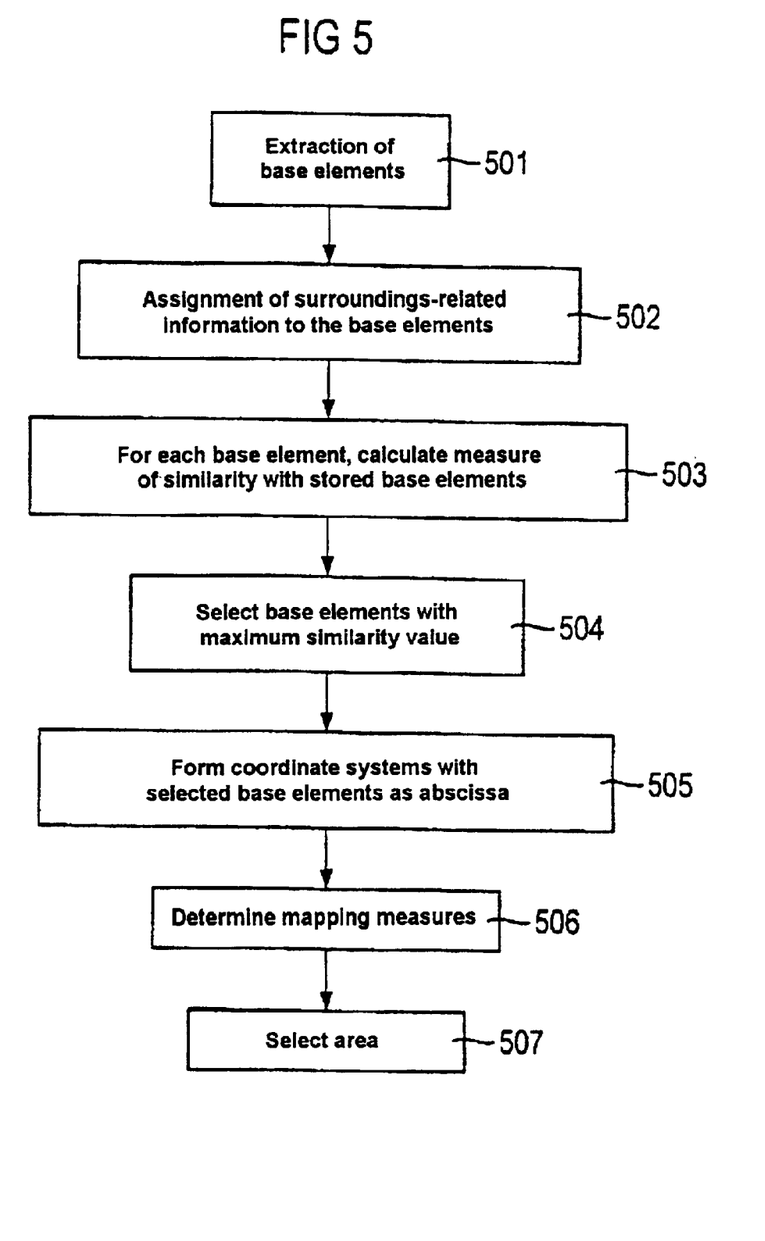
FIG. 5 is a flowchart illustrating method steps of an exemplary embodiment.

The following method, which is illustrated in FIG. 5, is carried out for this purpose. In a first step 501, base elements are extracted from the recorded image 111 by the processor 209. A base element is to be understood as a section having a starting point and an end point, which in each case represents a wall in the passageway 102. Further base elements are points or lines of predeterminable form. The extraction is effected using known image processing methods.

After the extraction of the base elements, the image is present and is symbolically represented by a set of defined base elements. Surroundings-related information is assigned to each base element. The surroundings-related information characterizes the corresponding base element and enables the identification of the respective base element within a set of all the base elements.

Figure 3A:
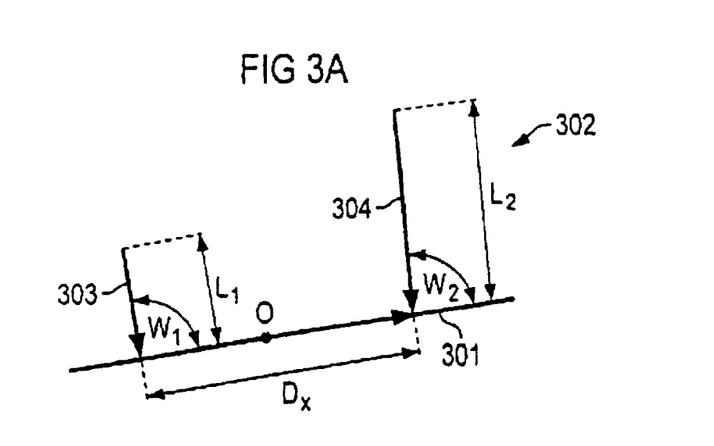
FIGS. 3a to 3c are diagrams illustrating, in each case, a base element with different surroundings-related information types and surroundings-related information features.
Figure 3B:
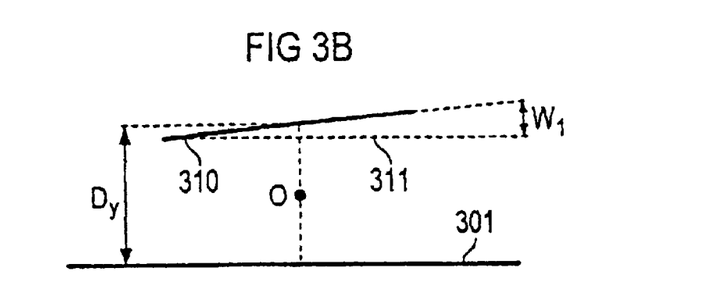
Figure 3C:
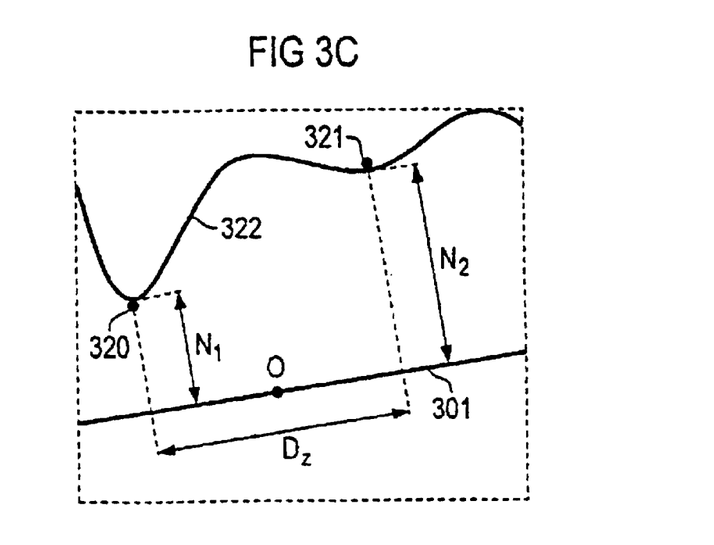

Such a base element 301 with surroundings-related information 302 assigned to the base element is illustrated in each case in FIG. 3a to FIG. 3c. The surroundings-related information is formed by a set of further base elements and their geometrical arrangement relative to one another and also to the base element 301 itself. The surroundings-related information assigned to the base element 301 is formed in such a way that it is (as far as possible) invariant with respect to errors which can occur when the map 101 is constructed by the robot 201. A pair of orthogonal base elements in the form of sections are particularly well suited to the method. In this case, exact orthogonality of the base elements is not important-some tolerance can readily be accepted.

The surroundings-related information assigned to the base element 301 is the distance between the points of intersection of the parallel base elements with the base element 301, designated by Dx in FIG. 3a. A first angle W1, which denotes an angle of intersection of a first further base element 303, having a length L1, with the base element 301, is stored as surroundings-related information. Furthermore, a second angle W2, which denotes an angle of intersection of the second further base element 304 with the base element 301, and also the length L2 of the second further base element 303 are assigned to the base element 301 as surroundings-related information. Further surroundings-related information assigned to the base element 301 is an indication of the starting point and/or of an ending point and thus also an orientation in each case of the first and/or second base element 303, 304.

The surroundings-related information is stored as a list assigned to the base element 301. The list is sorted in a predeterminable manner. The pair of orthogonal base elements, as illustrated in FIG. 3a as surroundings-related information, forms a surroundings-related information type. The above-described individual elements assigned to the base element 301 as surroundings-related information form surroundings-related information features which are each assigned to the surroundings-related information type.

A second surroundings-related information type is a further base element 310 parallel to the base element 301 (cf. FIG. 3b). Once again, exact parallelism of the further base element 310 with respect to the base element 301 is not necessary. A distance Dy between the base element 301 and the further, parallel base element 303 and also a third angle W3, between the exact parallel line 311 with respect to the first base element 301, shifted by the distance Dy, and the actual position of the further, parallel base element 310 are stored as surroundings-related information features.

FIG. 3c shows a further surroundings-related information type in the form of points 320, 321, which denote points of a line structure 322 which lie the nearest to the base element 301. In this case, a distance between the points 320, 321 (designated as Dz) and also the shortest distances N1, N2 of the points 320, 321 from the base element 301 are stored as surroundings-related information features.

In the predetermined, stored map 101, surroundings-related information items are in each case assigned to the base elements in the same way. Consequently, the stored map 101 has a set of base elements with, in each case assigned to the base elements, surroundings-related information in the form of surroundings-related information types with surroundings-related information features assigned to the surroundings-related information types.

Thus, in a second step 502, the surroundings-related information items are in each case assigned to the base elements contained in the image area 111 and also to the base elements contained in the map 101. For each base element 301, in a further step 503, a value of a measure of similarity (discussed below) is formed with all the further base elements.

In this exemplary embodiment, it is assumed that a total value U of the surroundings-related information assigned in each case to the base element 301 is produced according to the following specification:

$$U=(OP,P,MP),$$

where
- OP designates the surroundings-related information features which are formed by pairs of further base elements oriented perpendicularly to one another,
- P designates the surroundings-related information features, formed by parallel base elements, and
- MP designates the surroundings-related information features of the punctiform surroundings-related information types.

The surroundings-related information features are present in the form of sorted lists.

Let $$v: U \times U \rightarrow \Re_0^+$$

be a formal definition of a comparison function.

Using the comparison function v, a comparison value is calculated for a pair of surroundings-related information items assigned in each case to two base elements. The higher the comparison value, the better the two surroundings-related information features of the base elements correspond to one another. For the definition of the comparison function v, the following three functions vOP, vP, vMP are defined:

$$vOP: OP \times OP \rightarrow \Re_0^+$$
$$vP: P \times P \rightarrow \Re_0^+$$
$$vMP: MP \times MP \rightarrow \Re_0^+,$$

where vOP describes a comparison value for surroundings-related information features of the surroundings-related information type with perpendicular further base elements and, analogously vP describes a comparison value of surroundings-related information features of the surroundings-related information type with parallel base elements. vMP describes a comparison value which determines surroundings-related information features of the surroundings-related information type with points as surroundings-related information features.

The comparison function v is defined as the weighted sum of the functions vOP, vP and vMP according to the following specification.

$$v(U1,U2)=aOP^*vOP(OP1,OP2)+aP^*vP(P1,P2)+aMP^*vMP(MP1,MP2).$$

The values aOP, aP and aMP in the numerical interval [0,1] are designated as weight values.

With the weight values aOP, aP and aMP, account is taken of the different significances of the individual surroundings-related information types with regard to the measure of similarity. The surroundings-related information type of the pairs of orthogonal further base elements OP has a greater meaningfulness with regard to the measure of similarity than the surroundings-related information type of the parallel further base elements P and the latter in turn has a greater meaningfulness than the surroundings-related information type with points as surroundings-related information features.

For each function vOP, vP, vMP a method of dynamic programming is in each case carried out for each base element and their surroundings-related information features, resulting in the formation of an intermediate similarity.

This is done in each case for each function vOP, vP, vMP using the following cost function $D_{i,j}$:

$$D_{i,j} = \min \begin{Bmatrix} D_{i-1,j} + \delta \\ D_{i-1,j} - 1 + \mu \\ D_{i,j-1} + \delta \end{Bmatrix}$$

where

δ designates a pre-determinable cost value which occurs if a surroundings-related information feature of the recorded image area cannot be assigned to a surroundings-related information feature of the stored map 101, $$-\mu = \frac{\delta}{\lambda},$$

where $$-\lambda = \prod_{k=1}^{n} \left( \max\left\{ 0, 1 - \frac{|a_{k,1} - a_{k,j}|}{\mathrm{MaxErr}_k} \right\} \right).$$

In this case k designates an index which unambiguously designates each surroundings-related information type which is taken into account in the context of the dynamic programming, n designates the number of base elements taken into account, $a_{k,i}$ and $a_{k,j}$ designate the individual surroundings-related information features which are stored in the sorted list of the respective surroundings-related information types, $a_{k,l}$ designating a surroundings-related information feature of a base element of the image area 111 and $a_{k,l}$ designating a surroundings-related information feature of a base element of the map 101, and $\mathrm{MaxErr}_k$ designates a predeterminable value specific to each surroundings-related information type.

The cost value δ should be determined empirically in such a way that, for the given application, 2·δ>$\mu$ if the assignment is correct, and $\mu$>2·δ if the assignment is not correct.

The following ratio of the individual weight values is advantageous:

aOP:aP:aMP=3:2:1.

The result of the comparison function v forms a value of the measure of similarity which describes the similarity between the first structure in the image area 111 and the second structure in the map 101 (step 503). In a further step 504, the pair of base elements from the first structure and/or the second structure is selected; the selected pair is that which has the highest value of the intermediate similarity value and is thus the most similar to one another. For the selected base elements, a canonical coordinate system is formed in the respective map, the abscissa of this formed system is formed by the respective base element (step 505).

In a further step 506 a mapping measure is subsequently determined. The mapping measure is used to determine, for the selected base elements, what magnitude of a translation or rotation is necessary in order to map the coordinate system for the base element of the first structure in each case onto a coordinate system of a base element of a further structure. Thus, step 506 clearly determines in each case the extent to which the coordinate system of the selected base element of the first structure must be shifted or "rotated" in order to "match" the coordinate system of the selected base element of a respective further structure. The area selected in the predetermined map is that area whose mapping measure and/or whose measure of similarity is minimal compared with the coordinate system for the base element of the first structure.

Proceeding from the selected base element, further base elements are selected in pairs (i.e., in each case a base element of the first structure and a base element of the second structure), whose values of the measures of similarity are greater than a predeterminable threshold value. The robot 201 now knows where it is situated within the map 101. Consequently, a final step 507 determines that area in the predetermined map 101 in which the robot 201 is situated.

Figure 4:
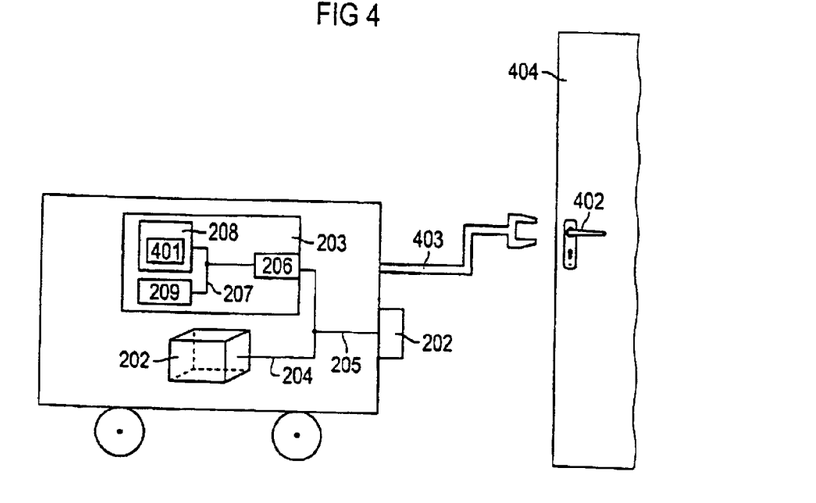
FIG. 4 is a schemati diagram illustrating an application of the method, in which a structure represents a model of a physical object.

A number of alternatives to the exemplary embodiment described above are presented below: the method described above can also be used for the general comparison of two structures, for example, for the comparison of a recorded image with a model of a physical object. This can be seen in with a model of a door handle that is to be gripped by the robot 201. A model 401 of a door handle is stored in the memory 208 of the computing unit 203 of the robot 201. The structure comparison is effected in the manner described above, the scanner of the robot 201 recording images of its surroundings and searching for a structure which is similar to the structure of the door-handle model 401. If such a structure is determined, then a gripping arm 403 of the robot 201 can grip the door handle 401, which is fitted to a door 404.

A further possibility for using the method is in the field of databases. Databases likewise have a structure, in which the data are stored. Consequently, the structure of the stored database can clearly be compared with a sought structure in the manner described above, and, as a result of this geometrical interpretation of the structure of a database, it is possible to determine a segment of the database in order to ensure a high reliability of the search results in the database in the context of a search.

Furthermore, the method can also be used for the progressive construction of the map 101 by the robot 201. This method then serves for checking when the robot 201 reaches a location where it has already been. In this case, the robot in each case compares the recording of an image with the stored structure data of a map 101 that is being constructed.

The method can also generally be used in the context of pattern recognition or image processing, the computation time required for carrying out the method being considerably reduced compared with the known methods in pattern recognition.

The above-described method and arrangement are illustrative of the principles of the present invention. Numerous modifications and adaptations thereof will be readily apparent to those skilled in this art without departing from the spirit and scope of the present invention.

What is claimed is:

1. A method for the computer-aided determination of a measure of similarity between a first structure and at least one predetermined second structure, comprising the steps of:

defining at least one base element for said first structure and said second structure;

assigning surroundings-related information to each of said at least one base elements, said surroundings-related information characterizing a corresponding said base element;

determining a measure of similarity, which describes a similarity between said first structure and said second structure, for said first structure and said second structure, said measure of similarity being determined in a manner dependent on said base elements and on said surroundings-related information assigned to said base elements;

forming said surroundings-related information by further base elements and their geometrical arrangement relative to said at least one base element;

grouping further base elements into a plurality of surroundings-related information types containing surroundings-related information features which are each assigned to a surroundings-related information type;

sorting said surroundings-related information features assigned to a surroundings-related information type in a predeterminable manner in a list; and storing said sorted said surroundings-related information features.

2. The method as claimed in claim 1, further comprising the step of including a plurality of base elements within said first structure or said second structure.

3. The method as claimed in claim 1, further comprising the step of including said first structure and said second structure in at least one map.

4. The method as claimed in claim 3, further comprising the step of using a recorder to record said at least one map.

5. The method as claimed in claim 4, wherein said recorder is a scanner.

6. The method as claimed in claim 4, wherein said recorder is a camera.

7. The method as claimed in claim 1, wherein said step of determining a measure of similarity encompasses a plurality of base elements and their respectively assigned surroundings-related information.

8. The method as claimed in claim 1, wherein at least a portion of said at least one base element is a line of predeterminable form.

9. The method as claimed in claim 8, wherein at least a portion of said at least one base element is a section.

10. The method as claimed in claim 1, wherein at least a portion of said at least one base element is a point.

11. The method as claimed in claim 1, wherein base elements have different forms.

12. The method as claimed in claim 3, further comprising the step of forming at least a portion of said surroundings-related information in such a way that it is invariant with respect to errors which occur when constructing said at least one map.

13. The method as claimed in claim 1, wherein said measure of similarity is determined with dynamic programming.

14. The method as claimed claim 1, further comprising the step of operating on a plurality of further structures, a measure of similarity between said first structure and a respective further structure being determined in each case.

15. The method as claimed in claim 14, further comprising the step of implementing said method repeatedly for different base elements, thus forming a plurality of measures of similarity.

16. The method as claimed in claim 14, further comprising the steps of:

selecting base elements of said first structure and of said further structures which have the greatest correspondence;

forming a local coordinate system in each case proceeding from said selected base elements in each structure;

forming a mapping measure in a manner dependent on a mapping of said coordinate system of said first structure onto a coordinate system of said second structure;

determining a structure which has the smallest mapping measure in a manner dependent on said mapping measure.

17. The method as claimed in claim 16, wherein said mapping measure describes a rotation of said local coordinate system from said first structure onto said respective further structure.

18. The method as claimed in claim 1, wherein said first structure or said second structure describes data structures in a database.

19. The method as claimed in claim 1, wherein said first structure or said second structure describes a physical object.

20. The method as claimed in claim 1, wherein said first structure describes a physical object and said second structure describes a model of a physical object.

21. The method as claimed in claim 1, further comprising the step of determining a map for a mobile autonomous apparatus.

22. The method as claimed in claim 1, further comprising the step of orientating a mobile autonomous apparatus.

23. The method as claimed in claim 21, wherein said mobile autonomous apparatus is a robot.

24. An arrangement for the computer-aided determination of a measure of similarity between a first structure and at least one predetermined second structure, comprising:

a processor configured to:

define at least one base element for said first structure and said second structure;

assign surroundings-related information to each base element, said surroundings-related information characterizing a corresponding base element;

determine a measure of similarity, which describes a similarity between said first structure and said second structure, for said first structure and said second structure, said measure of similarity being determined in a manner dependent on said at least one base element and on said surroundings-related information assigned to said respective base elements;

operate on said further base elements that are grouped into a plurality of surroundings-related information types containing surroundings-related information features which are each assigned to a surroundings-related information type;

the arrangement further comprising:

further base elements and their geometrical arrangement relative to said base elements that form said surroundings-related information; and a memory, in which said surroundings-related information features assigned to a surroundings-related information type are stored having been sorted in a predeterminable manner in a list.

25. The arrangement as claimed in claim 24, wherein a plurality of base elements are contained in said first structure or said second structure.

26. The arrangement as claimed in claim 24, wherein said first structure or said second structure is contained in at least one map.

27. The arrangement as claimed in claim 26, further comprising a recorder for recording said at least one map.

28. The arrangement as claimed in claim 27, wherein said recorder is a scanner.

29. The arrangement as claimed in claim 27, wherein said recorder is a camera.

30. The arrangement as claimed in claim 24, wherein said measure of similarity is determined based on a plurality of base elements and their respectively assigned surroundings-related information.

31. The arrangement as claimed in claim 24, wherein said processor is configured to operate on said at least one base element that is a line of predeterminable form.

32. The arrangement as claimed in claim 31, wherein said processor is configured to operate on at least a portion of said at least one base element that is a section.

33. The arrangement as claimed in claim 24, wherein said processor is configured to operate on at least a portion of said at least one base element that is a point.

34. The arrangement as claimed in claim 24, wherein said processor is configured to operate on base elements having different forms.

35. The arrangement as claimed in claim 24, wherein said processor is configured to operate on at least a portion of said surroundings-related information that is formed in such a way that it is invariant with respect to errors which occur when constructing a map.

36. The arrangement as claimed in claim 24, wherein said processor is configured to utilize dynamic programming to form said measure of similarity.

37. The arrangement as claimed in claim 24, wherein said processor is configured to process a plurality of further structures, a measure of similarity between said first structure and a respective further structure being determined in each case.

38. The arrangement as claimed in claim 37, wherein said processor operates repeatedly on different base elements, and forms a plurality of respective measures of similarity.

39. The arrangement as claimed in claim 37, wherein said processor is configured to:
    select base elements of said first structure and of said further structures which have the greatest correspondence;
    form a local coordinate system in each case proceeding from said selected base element in each structure;
    form a mapping measure in a manner dependent on a mapping of said coordinate system of said first structure onto said coordinate system of said second structure; and
    determine a structure which has the smallest mapping measure in a manner dependent on said mapping measure.

40. The arrangement as claimed in claim 39, wherein said mapping measure describes a rotation of said local coordinate system from said first structure onto a respective further structure.

41. The arrangement as claimed in claim 24, wherein said structures describe data structures in a database.

42. The arrangement as claimed in claim 24, wherein said structures each describe a physical object.

43. The arrangement as claimed in claim 24, wherein said first structure describes a physical object and said second structure describes a model of a physical object.

44. The arrangement as claimed in claim 26, wherein said map is utilized for a mobile autonomous apparatus.

45. The arrangement as claimed in claim 26, wherein said arrangement orients a mobile autonomous apparatus.

46. The arrangement as claimed in claim 44, wherein said mobile autonomous apparatus is a robot.

47. The method as claimed in claim 22, wherein said mobile autonomous apparatus is a robot.

48. The arrangement as claimed in claim 34, wherein said processor is configured to operate on said further base elements that are grouped into a plurality of surroundings-related information types containing surroundings-related information features which are each assigned to a surroundings-related information type.

49. The arrangement as claimed in claim 35, wherein said processor is configured to operate on said further base elements that are grouped into a plurality of surroundings-related information types containing surroundings-related information features which are each assigned to a surroundings-related information type.

50. The arrangement as claimed in claim 48, further comprising:
    a memory, in which said surroundings-related information features assigned to a surroundings-related information type are stored having been sorted in a predeterminable manner in a list.

51. The arrangement as claimed in claim 49, further comprising:
    a memory, in which said surroundings-related information features assigned to a surroundings-related information type are stored having been sorted in a predeterminable manner in a list.

52. The arrangement as claimed in claim 45, wherein said mobile autonomous apparatus is a robot.

* * * * *